H. H. KURKJIAN.
MEANS FOR MEASURING RIBBONS AND THE LIKE.
APPLICATION FILED MAR. 27, 1915.
1,190,916.
Patented July 11, 1916.
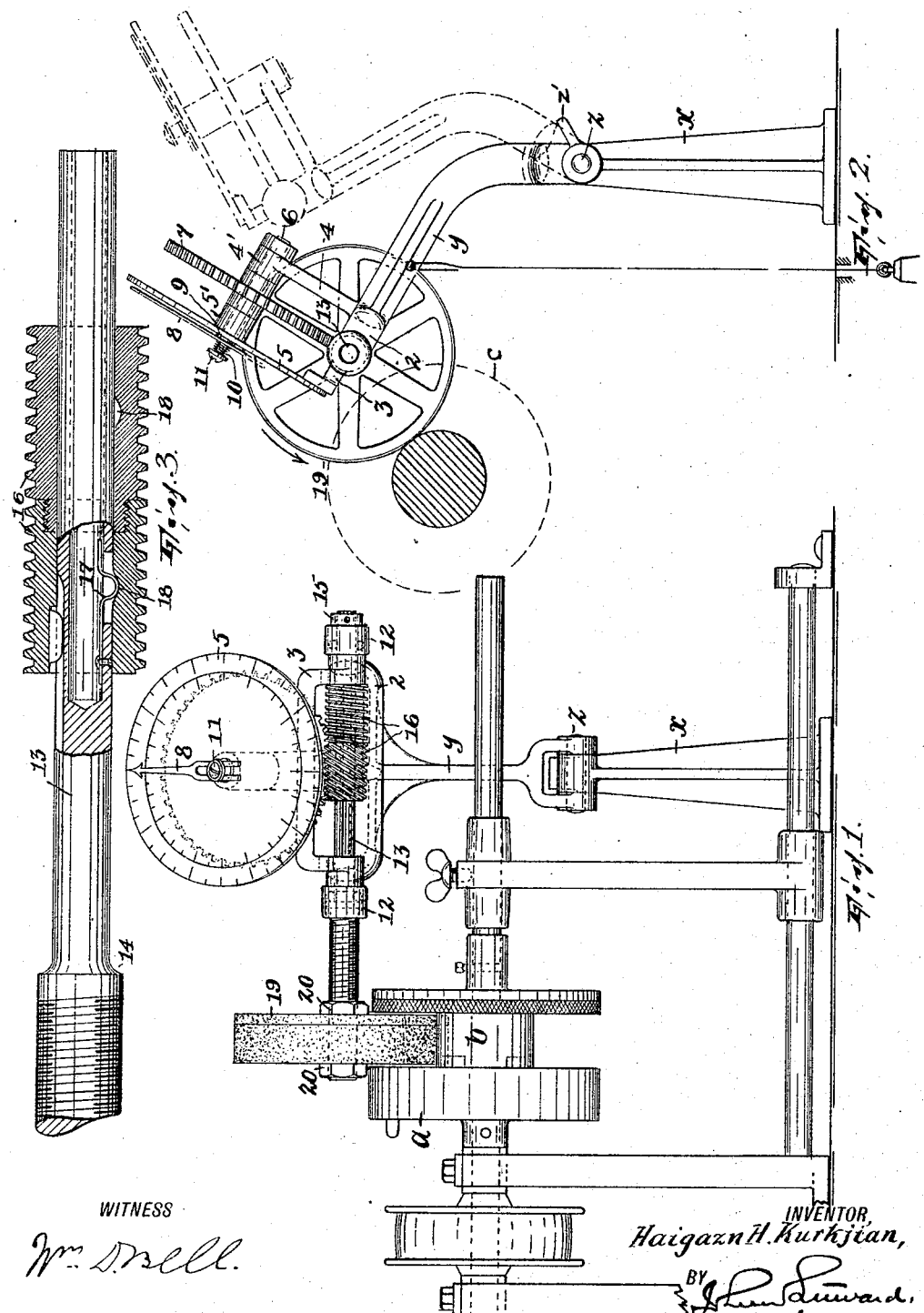
WITNESS
INVENTOR,
Haigazn H. Kurkjian,
BY
ATTORNEY.

UNITED STATES PATENT OFFICE.

HAIGAZN H. KURKJIAN, OF PATERSON, NEW JERSEY.

MEANS FOR MEASURING RIBBONS AND THE LIKE.

1,190,916.  Specification of Letters Patent.  Patented July 11, 1916.

Application filed March 27, 1915. Serial No. 17,312.

*To all whom it may concern:*

Be it known that I, HAIGAZN H. KURKJIAN, a subject of the Sultan of Turkey, residing at Paterson, in the county of Passaic and State of New Jersey, have invented certain new and useful Improvements in Means for Measuring Ribbons and the like, of which the following is a specification.

This invention relates to means for measuring ribbons and similar materials in the process of forming them into wound packages, and it consists in a novel combination and arrangement of parts whereby different units of measurement may be called into service at the means specifically devoted to indicating the amount of yardage wound.

In the accompanying drawings, Figures 1 and 2 are a front elevation and a side elevation of the invention and Fig. 3 illustrates a detail, partly in section.

Referring first to Figs. 1 and 2 there are shown a suitably supported rotary head stock $a$ and a block $b$ attached thereto on which a roll of ribbon $c$ is wound when the head stock is driven and thereby rotates the block.

$x$ is a support in the form of a bracket and $y$ a supporting member or arm pivoted therein on a horizontal axis $z$. The free end portion of the member $y$ is in this case formed as a fork 2 provided with a forwardly projecting yoke 3. Upstanding from the fork is a bearing arm 4 and upstanding from the yoke is a fixed dial 5 having concentric dial markings thereon as shown in Fig. 1. Bearings 4' and 5' on the arm and dial receive a rotary spindle 6 on which is fixed between the bearing 4' and 5' a worm gear 7. On the reduced forward end of the spindle 6 is fixed the bifurcated portion of a pointer 8 which is held against the shoulder 9 on the spindle by a spiral spring 10 interposed between the pointer and a screw 11 tapped in the end of the spindle. The pointer by this arrangement may be shifted radially inward or outward to operate with reference to either of the dial markings, and in either position will rotate with the spindle.

In ball bearings 12 in the fork 2 is journaled a shaft 13 which projects laterally at one end and in its projecting portion is threaded and which is kept against endwise movement by a shoulder 14 thereon and a collar 15. A worm 16 including two worm portions of different pitch (preferably formed separately and joined by screw threading as shown in Fig. 3) is splined on the shaft 13 between the arms of the fork 2. Its teeth are engaged by the teeth of the worm gear 7 and it is adapted to be shifted so as to bring one or other of its worm portions in engagement with said worm gear. The worm is held in either position by a bent plate spring 17 adapted to engage in either of two notches 18 in the bore of the worm, the spring being secured to the shaft.

On the threaded portion of the shaft is arranged a peripherally sanded or otherwise roughened wheel 19, the same being divided into sections (of any number) clamped immovably with reference to each other and the shaft by the two nuts 20 engaged with the threading of and arranged on said shaft. By forming the wheel 19 in sections I can alter its width, by adding or omitting one or more sections, to suit the width of the ribbon being measured; since a paper strip is usually wound up with the ribbon wound upon the block $b$ it is of great advantage that the width of the wheel 19 may thus be altered to suit that of the ribbon and paper, the ribbon and paper and especially the latter running true and without crinkling at the edges, which is impossible otherwise.

At the start of the operation of winding and measuring, the supporting member is swung back to the position shown in Fig. 2, resting against a stop $z'$, and when a roll or block $b$ has been attached to the head stock $a$ said member is swung forward until wheel 19 rests on said roll or block. The head stock and roll being then started rotating the rotary movement will be imparted to the threaded shaft 13 and through one of the worm sections and worm-wheel 7 to the pointer. As the winding proceeds and the ribbon package increases in diameter, member $y$ will gradually move back on its pivot toward the dotted line position in Fig. 2. It will thus be seen that the yardage indicated by the pointer on the dial will be exactly that of the ribbon actually wound on the block $b$ when the winding stops, the yardage indicated being exactly equal to the longitudinal surface length of the wound material. It will be understood that when the pointer is shifted radially outward to operate with reference to the outer dial the worm section having the greater pitch is put in mesh with the worm-wheel, and that when the pointer is shifted radially inward to operate with reference to the inner dial the other worm section is put in mesh with the worm-wheel; thus the machine is adapted to measure in units of different quantity.

My apparatus possesses the advantage that by having the wheel 19 bear on the roll or block $b$, said wheel acts, on account of the pressure exerted thereby and by the member $y$ and the other parts movable with said member, to promote smoothness of winding and compactness in the finished package.

Having thus fully described my invention, what I claim as new and desire to secure by Letters Patent is:—

The combination of a support, a supporting arm pivoted therein on a horizontal axis, said arm having a fork at its free end, a shaft journaled in the fork parallel with the axis of pivotal movement of the arm, a contact wheel adapted to bear against the roll of material being wound and arranged on the shaft, a worm having portions of different pitch splined on the shaft between and movable from one to the other of the fork-forming parts of the arm and having means to releasably hold it at either limit afforded by said parts, and indicating means carried by said supporting arm and including a worm wheel journaled therein and having its teeth meshing with the worm.

In testimony whereof I affix my signature.

HAIGAZN H. KURKJIAN.

Copies of this patent may be obtained for five cents each, by addressing the "Commissioner of Patents, Washington, D. C."